Feb. 17, 1931. B. F. SEYMOUR 1,793,337
VEHICLE CONSTRUCTION AND SUSPENSION
Original Filed Oct. 8, 1923   2 Sheets-Sheet 1
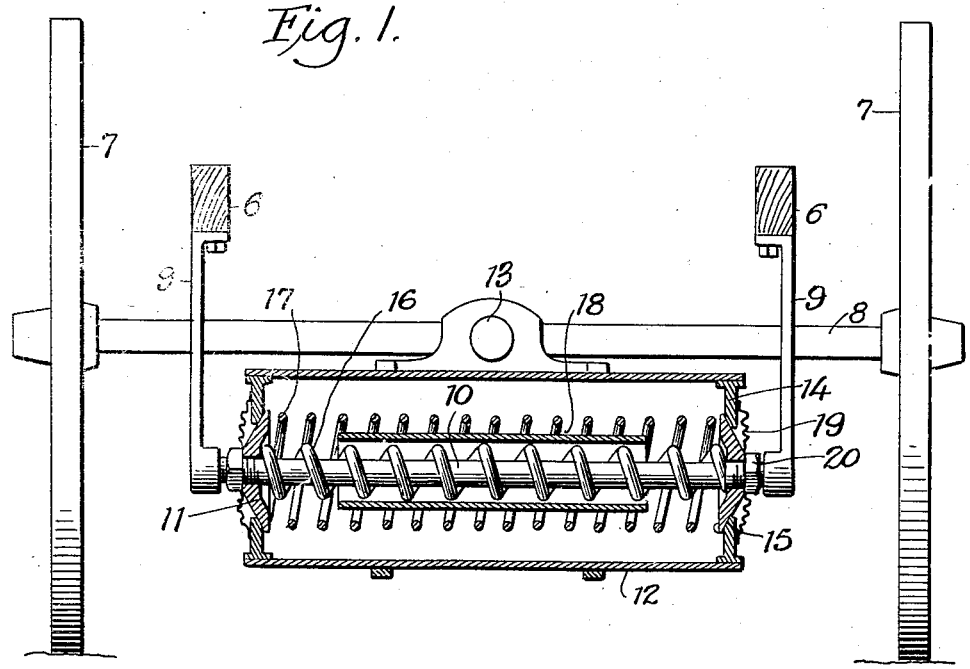
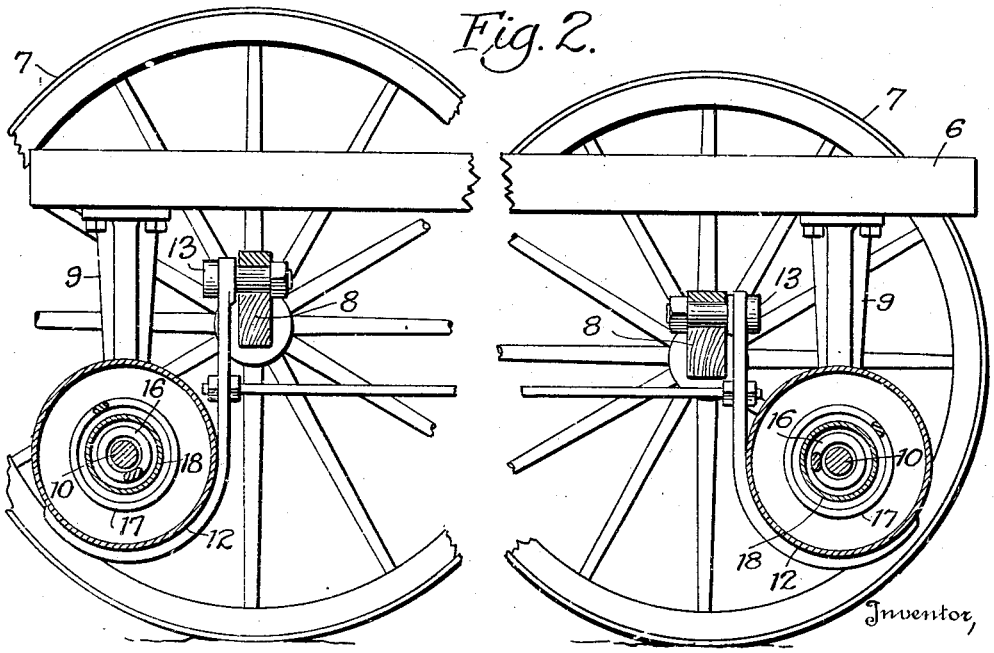
Inventor,
B. F. Seymour,
By
Attorney Feb. 17, 1931.    B. F. SEYMOUR    1,793,337
VEHICLE CONSTRUCTION AND SUSPENSION
Original Filed Oct. 8, 1923    2 Sheets-Sheet 2
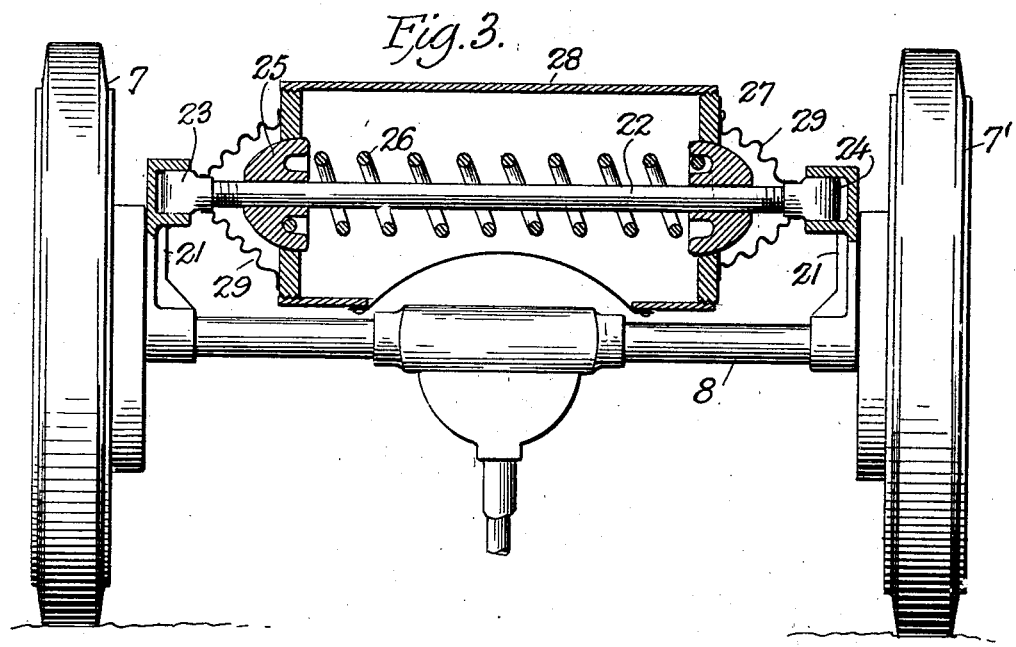
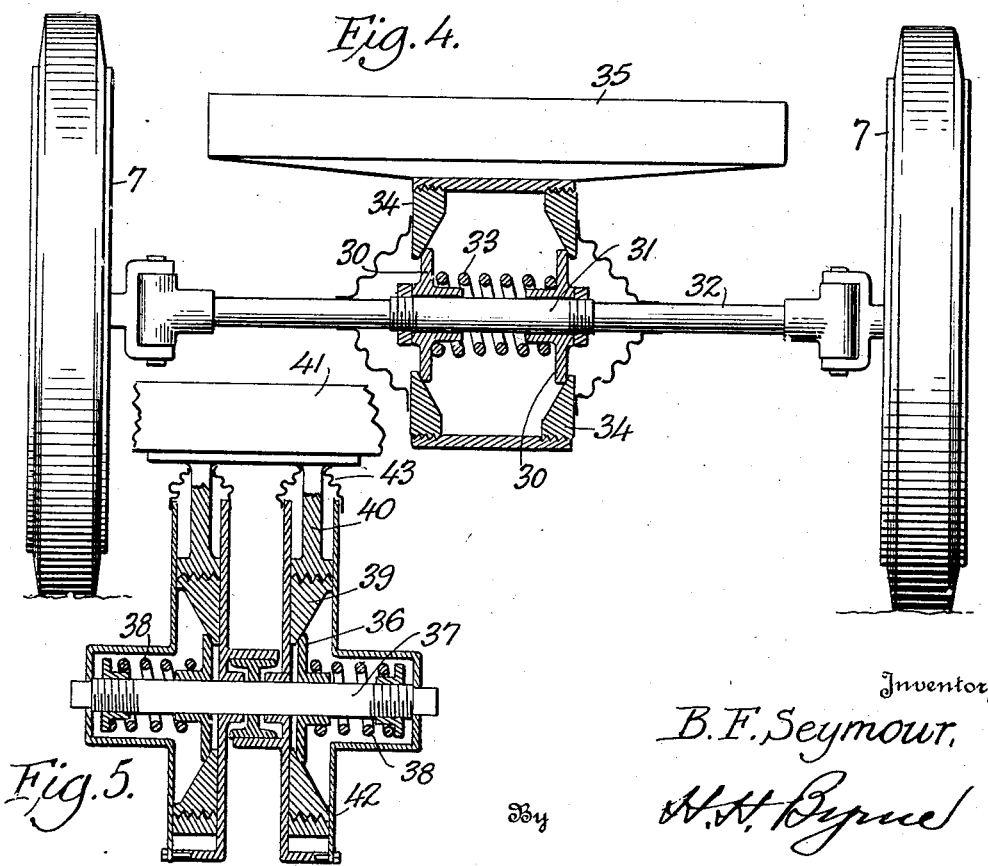
Inventor,
B. F. Seymour,
By
Attorney Patented Feb. 17, 1931

1,793,337

UNITED STATES PATENT OFFICE

BENJAMIN F. SEYMOUR, OF WASHINGTON, DISTRICT OF COLUMBIA

VEHICLE CONSTRUCTION AND SUSPENSION

Application filed October 8, 1923, Serial No. 667,319. Renewed May 1, 1928.

The present invention relates to resilient suspensions for vehicle bodies and consists in the combinations and arrangements of elements hereinafter described and particularly set forth in the accompanying claims.

The purpose of the invention is to provide the body of a vehicle, especially of the motor driven type, with resilient means for indirectly absorbing and dissipating all shocks or jars to which the vehicle wheel is subjected, and without causing undue strain on either the wheel or its axle or transmitting excessive vibration to the supported load.

Another object of the indirect suspension as proposed herein is the employment of apparatus and disposal of the elements thereof in such a manner as will secure the maximum stability of the resilient sustaining structure, and equitable location or distribution of the resilient devices per se with regard to the body section or frame on which the same are mounted.

The invention is further characterized in that the resilient supporting elements are reciprocably mounted on the respective axles of the vehicle to the end that the vehicle wheels easily pass over any unevenness in the road bed without interfering with the equilibrium or even riding of the vehicle body.

The different constructions herein shown are proposed as modifications of those types of vehicle body suspension forming the subject-matter of my co-pending application for U. S. patent Serial No. 365,037, and filed March 11, 1920, now Patent No. 1,503,065 dated July 29, 1924, and Serial Number 430,694, filed Dec. 14, 1920, now Patent No. 1,556,165 dated October 6, 1925.

The invention is disclosed by way of illustration in the accompanying drawings, wherein:

Figure 1 is a longitudinal sectional view showing the application of the invention to a vehicle.

Fig. 2 is a transverse sectional view showing the same as applied to the front and rear axles of the vehicle.

Fig. 3 is a view similar to Fig. 1 of a modified construction.

Fig. 4 is a similar view of another form, and

Fig. 5 is a detail transverse sectional view showing a further modification.

Referring to the construction in further detail, and wherein like reference characters designate corresponding parts in the different views shown, the apparatus consists of the body section or frame 6 of the vehicle having the usual wheels 7 journaled on the axle 8; and 9 designates two hanger arms dependingly secured to the frame 6 and connected at their lower ends by a horizontally disposed shaft 10, as shown. A pair of similar and oppositely acting cone heads 11 are mounted to have limited reciprocable movement on the hanger shaft 10, as shown.

A cylindrical casing 12 is pivotally mounted on a bolt 13 that is suitably journaled at the middle point of the axle 8. It will be understood, of course, that the apparatus described herein is duplicated on each of the vehicle axles. The two pivotal bearings 13 are variant or in non-alinement as clearly shown in Fig. 2. It will be noted that this construction and arrangement provides for with-holding the body section or frame from side tilting or swaying quite regardless of any simultaneous or independent tilting of the wheel axles; i. e. the frame or body section of the vehicle always remains level, though the axles may take any degree of rocking or tilting due to the road-way.

The respective heads 14 of the cylinder casing 12 are centrally cut away and formed with beveled edges 15 to provide cone elements for engaging and coperating with the cone heads 11 to the end of absorbing any shocks or jars encountered in the travel of the vehicle; said cone elements 11 and 15 are normally held in cooperative relation under the tension of a pair of springs 16 and 17 of relatively different diameters, mounted within the casing 12, as shown. A sleeve 18 of suitable length is interposed between the spring elements 16 and 17 to keep the same in proper alinement and against undue friction, as will be understood. The respective ends of the cylindrical casing are suitably closed by flexible diaphragms 19 and the respective ends of the shaft 10 are fitted with adjustable nuts 20, providing suitable abutments for the cone heads 11.

In the construction shown in Fig. 3 a pair of upright arms 21 suitably support a transverse shaft 22 having head members 23 on its respective ends, fitting within suitable recesses 24 formed in said upright arms 21. The shaft 22 is provided with a pair of movable cone heads 25 adapted to have limited movement against the tension of the spring 26, and cooperable with beveled edges formed on the respective ends 27 of the cylinder or casing 28 that is in turn secured to the body of the car. The cone heads 25 are adjustably mounted on the shaft 22 and flexible diaphragms 29 inclose the respective ends of the cylinder casing, as shown.

In the construction shown in Fig. 4 a pair or disk-like members 30 are reciprocably mounted on the middle portion 31 of the vehicle axle 32 and are normally distended by the spring member 33. A pair of cone heads 34 mounted on the frame or body 35 of the vehicle engage the top cone heads 30 and under relative movement between the vehicle body and the axle 32, said cone heads 30 are compressed against the tension of the spring 33, as will be understood.

In the arangement shown in Fig. 5 the support consists of two disk-like members 36 reciprocable on the shaft 37 against the tension of the springs 38. The cooperable arrangement is in the form of a cone head 39 mounted on a hanger 40 suitably secured to the frame 41 or other structure to be supported. In each case the working mechanism is separately inclosed within a suitable dust-proof casing 42 as shown, and a flexible diaphragm 43 incloses the upper end of said casing.

It will thus be seen that the types of indirect suspensions herein disclosed operate to transpose or cause all thrusts to act at right angles to impact or recoil thrust, i. e., at a right angle to the direction of imparted thrust. And in like manner does the recoil or reaction function.

It is obvious that those skilled in the art may vary the details of construction and arrangement of parts without departing from the spirit of my invention, and, therefore, I do not wish to be limited to such features except as may be required by the claims.

Having thus described the invention what is claimed as new is:

1. In a resilient suspension for vehicle bodies, the combination with a frame, an axle, and a wheel journaled thereon, a hanger including a shaft mounted on the frame, cone elements reciprocable on said shaft, cone elements mounted on the axle cooperable with said shaft cone elements, and resilient means holding said cone elements in cooperative relation.

2. In a resilient suspension for vehicle bodies, the combination with a frame, an axle, and a wheel journaled thereon, a hanger mounted on the frame, a pair of cone elements reciprocable on said hanger, a casing mounted on the axle having cone elements cooperable with the cone elements of the hanger, and resilient means located within the casing holding said cone elements in cooperative relation, substantially as set forth.

3. In a resilient suspension for vehicle bodies, the combination with a frame, an axle, and a wheel journaled thereon, a pair of hanger arms mounted on the frame, a shaft connecting said hanger arms, a pair of oppositely acting cone heads reciprocable on the hanger shaft, a pair of cone elements mounted on the axle cooperable with said shaft cone heads, and resilient means mounted on the hanger shaft holding said cone elements in cooperative relation, substantially as set forth.

4. In a resilient suspension for vehicle bodies, the combination with a frame, an axle, and a wheel journaled thereon, a pair of hanger arms mounted on the frame, a shaft connecting said hanger arms, a pair of oppositely acting cone heads mounted on the hanger shaft, a cylindrical casing mounted on the axle having cone heads cooperable with the cone heads of the hanger shaft, and springs located within the cylindrical casing holding said cone elements in cooperative relation.

5. In a resilient suspension for vehicle bodies, the combination with a frame, an axle, and a wheel journaled thereon, a hanger mounted on the frame, a pair of oppositely acting cone heads mounted on the hanger, a cylindrical casing mounted on the axle, said casing having its respective heads constructed with beveled edges engaging with the cone elements of the hanger, and resilient means located within the cylindrical casing for tensioning the hanger cone heads against the beveled edges of said casing, substantially as set forth.

6. In a resilient suspension for vehicle bodies the combination with a frame, an axle, and a wheel journaled thereon, hanger arms mounted on the frame, a shaft suspended between said arms and carrying cone elements, a supporting member pivotally mounted on the axle, cone elements on said pivoted member cooperable with said first mentioned cone elements, and means holding said cone elements in cooperative relation, substantially as set forth.

7. In a resilient suspension for vehicle bodies, the combination with a frame, an axle, and a wheel journaled thereon, a hanger mounted on the frame having a horizontal shaft, cone elements reciprocably mounted on said shaft, a support pivotally mounted on the axle, cone elements on said support cooperable with the cone elements of the hanger, and means holding said cone elements in cooperative relation, substantially as set forth.

8. In vehicle construction and suspension, the combination of a frame, front and rear axles, wheels journaled on the axles, a hanger for each of the axles and means for securing the hangers on the frame, a casing for each hanger, resiliently operable cone elements inserted between each casing and the corresponding hanger, and pivoted bearings on the axles for the casings, said bearings being situated in the same vertical plane but in non-alignment, substantially as set forth.

9. In vehicle construction and suspension, the combination of a frame, front and rear axles, wheels journaled on the axles, a hanger for each of the axles, including arms secured to the frame, a shaft connecting the arms, cone elements reciprocably mounted on the shaft; a casing for each hanger having other cone-elements cooperable with said first cone elements, resilient means adapted to keep the respective cone elements in engagement; and pivoted bearings on each axle for its casing, said bearings being situated in the same vertical plane but in non-alignment, substantially as set forth.

10. In a vehicle construction, the combination with a vehicle body, axles and wheels thereon, of a journal on each axle with its axis at right angles to the axis of the wheel axle, a casing suspended from and offset with respect to said journal and provided with opposing friction elements, other friction elements associated with said body and mounted within the casing, and means to yieldingly urge said other elements into frictional engagement with the first elements, whereby to hold the vehicle body against tilting or swaying, substantially as set forth.

11. In a wheeled vehicle the combination of a body portion, front and rear wheel mounted axles, and non-alined pivotal bearing connections between the vehicle body and the respective axles, said pivotal bearings being on axes parallel to the longitudinal axis of the body portion, substantially as set forth.

12. In a wheeled vehicle the combination of a body portion, front and rear wheel mounted axles, and resilient suspension means mounting the body on each axle, said resilient suspension means having pivotal connections with the axles, and said pivotal connections being in non-alinement and on axes parallel to the longitudinal axis of the body portion, substantially as set forth.

13. In a wheeled vehicle the combination of a body portion, front and rear wheel mounted axles, and a resilient means associating said body and axles, said resilient means having pivotal connections conjoining said axles and body, and said pivotal connections being in non-alinement and on axes parallel to the longitudinal axis of the body portion, substantially as set forth.

In testimony whereof I affix my signature.

BENJAMIN F. SEYMOUR.